(12) United States Patent
Babka et al.

(10) Patent No.: US 8,819,050 B2
(45) Date of Patent: *Aug. 26, 2014

(54) CONTEXT-AND-VERSION-AWARE FACADE FOR DATABASE QUERIES

(75) Inventors: James Joseph Babka, Austin, TX (US); Ryan Shillington, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,242

(22) Filed: Sep. 14, 2012

(65) Prior Publication Data

US 2013/0013633 A1  Jan. 10, 2013

Related U.S. Application Data

(63) Continuation of application No. 13/167,813, filed on Jun. 24, 2011.

(51) Int. Cl.
*G06F 17/30* (2006.01)

(52) U.S. Cl.
CPC .............................. *G06F 17/30017* (2013.01)
USPC ......................................... 707/765; 707/803

(58) Field of Classification Search
USPC .......... 707/736, 765, 766, 770, 773, 812, 803
See application file for complete search history.

(56) References Cited

U.S. PATENT DOCUMENTS

| | | | |
|---|---|---|---|
| 6,374,239 B1 * | 4/2002 | Anderson et al. ............. | 707/760 |
| 6,597,366 B1 | 7/2003 | Bennett et al. | |
| 6,665,685 B1 | 12/2003 | Bialic | |
| 6,694,328 B1 | 2/2004 | Bennett | |
| 7,260,819 B2 | 8/2007 | Spotswood et al. | |
| 7,509,307 B2 | 3/2009 | Biswal et al. | |
| 7,610,316 B2 | 10/2009 | Bartz et al. | |
| 7,653,620 B2 * | 1/2010 | Arnold et al. ............ | 707/999.004 |
| 7,805,439 B2 | 9/2010 | Elliott et al. | |
| 7,836,028 B1 | 11/2010 | Agarwal et al. | |
| 7,904,467 B2 | 3/2011 | Bodin et al. | |
| 2005/0050040 A1 | 3/2005 | Theobald et al. | |
| 2008/0028382 A1 * | 1/2008 | Arnold et al. .................. | 717/155 |
| 2008/0040320 A1 | 2/2008 | Dettinger et al. | |
| 2009/0307277 A1 | 12/2009 | Grubov et al. | |
| 2010/0042605 A1 | 2/2010 | Cheng et al. | |
| 2010/0223430 A1 | 9/2010 | Walker et al. | |

OTHER PUBLICATIONS

Brahmia et al., Schema Versioning in Multi-temporal XML Databases, 2008, IEEE, 158-164.*

Fang et al.; "A Version-Aware Approach for Web Service Client Application", IM 10th IFIP/IEEE International Symposium on, May 21-25, 2007, pp. 401-409.

(Continued)

*Primary Examiner* — Jean B Fleurantin
(74) *Attorney, Agent, or Firm* — Joe Polimeni; Edell, Shapiro & Finnan, LLC

(57) ABSTRACT

A method, computer program product, and system for accessing versioned data objects within a database, comprising creating a first new connection to a database stored in a memory, receiving a first query from a first client that requests access to a versioned data object stored in the database, and modifying the received first query to add contextual information configured on the first new connection, so that the modified first query is able to retrieve a first version of the versioned data object that corresponds to the contextual information.

25 Claims, 4 Drawing Sheets

(56) References Cited

OTHER PUBLICATIONS

Fang et al.; "A Version-Aware Approach for Web Service Directory", ICWS IEEE International Conference on, Jul. 9-13, 2007, pp. 406-413.

Pereira et al.; "Schema Versioning: Queries to the Generalized Temporal Database System", Proceedings Tenth International Workshop on, Sep. 1-3, 1999, pp. 458-459.

Motorola et al.; "Context-Aware Social Networking Mechanism for Achieving Lightweight P2P Authentication", IPCOM000157020D, Aug. 9, 2007.

* cited by examiner

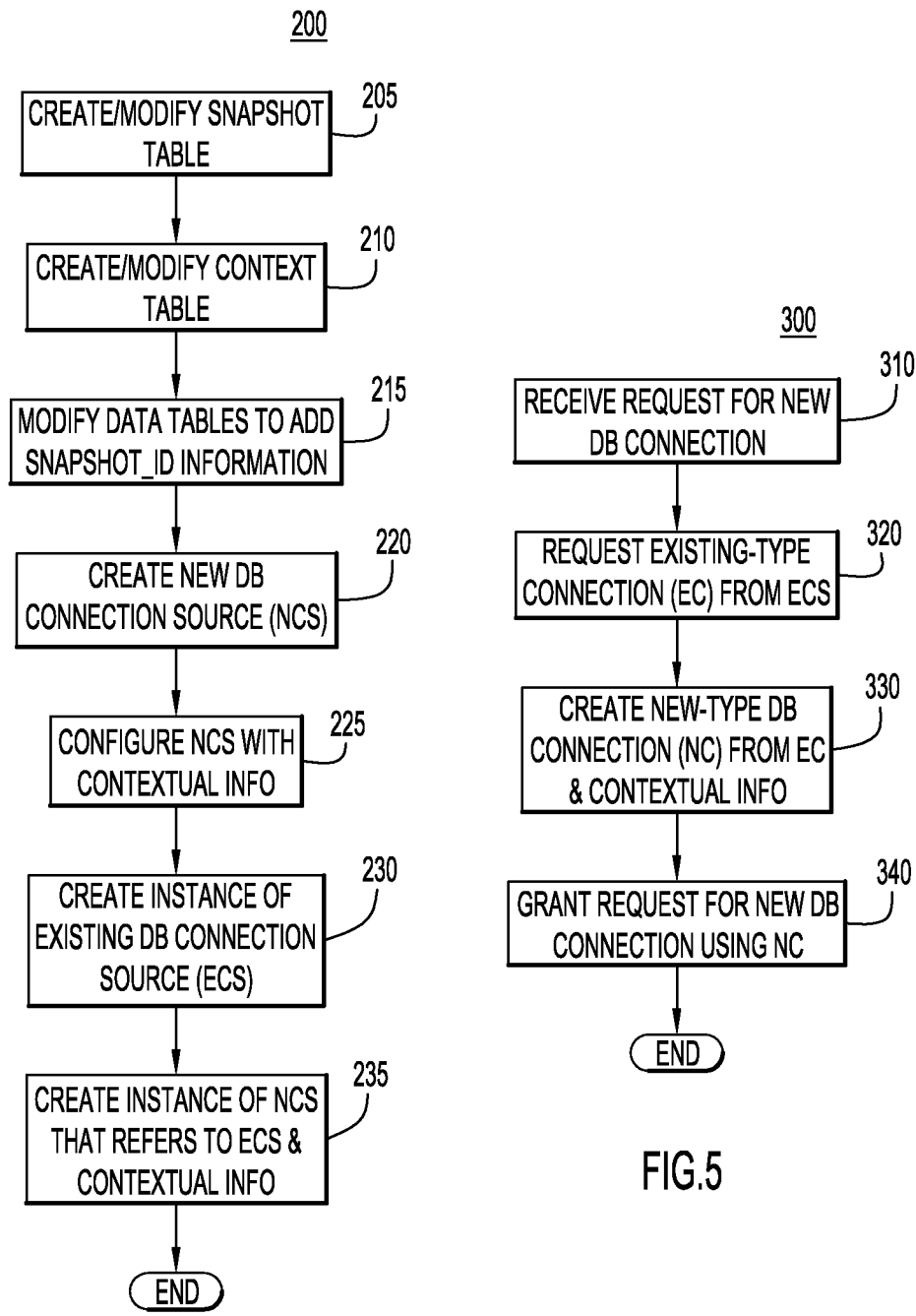

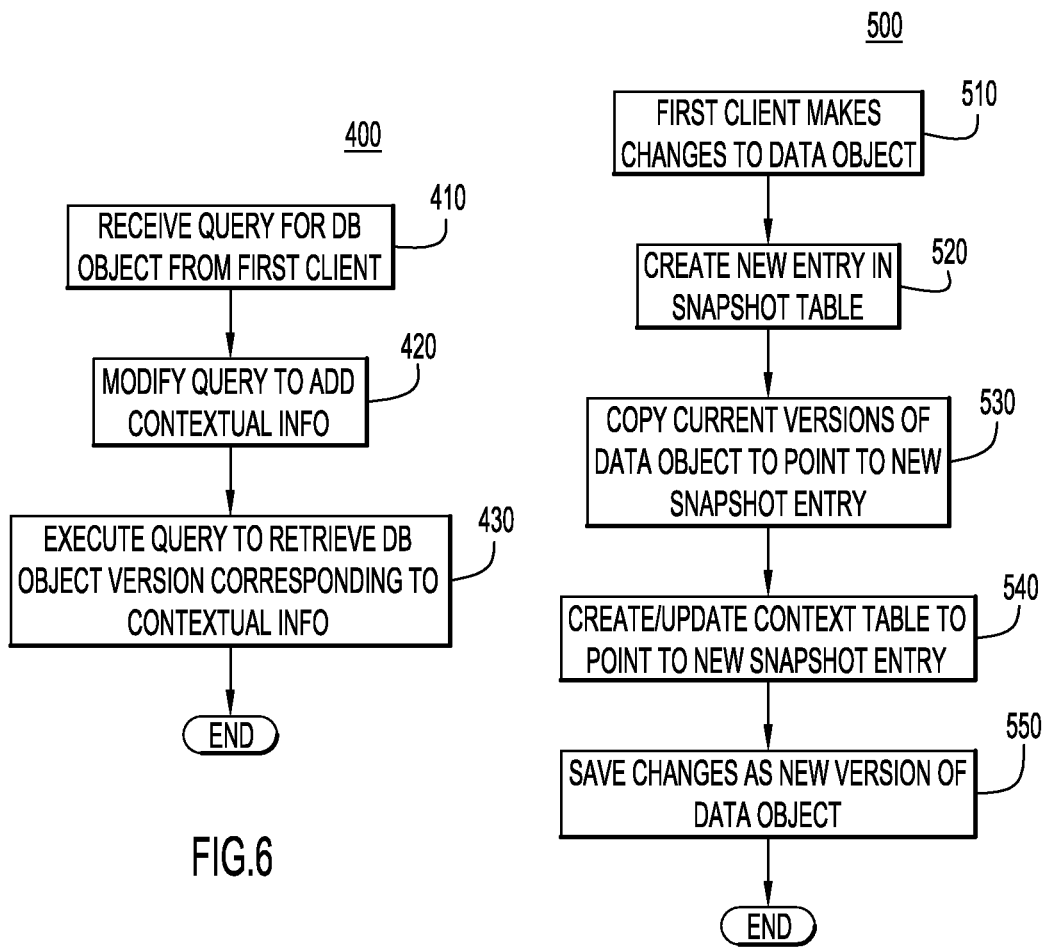

CONTEXT-AND-VERSION-AWARE FACADE FOR DATABASE QUERIES

CROSS-REFERENCE TO RELATED APPLICATIONS

This application is a continuation of U.S. patent application Ser. No. 13/167,813, entitled "Context-And Version-Aware Façade For Database Queries" and filed Jun. 24, 2011, the disclosure of which is incorporated herein by reference in its entirety.

BACKGROUND

1. Technical Field

The present invention relates generally to data processing, and more particularly to improved processing of database queries.

2. Discussion of Related Art

In today's global economy, the ability of an enterprise to efficiently store, update, and use information can be critical to the enterprise's ability to serve its customers and compete in the marketplace. This information is often stored in databases, in the form of database objects such as data sets, tables, indices, or stored queries. A database system may maintain multiple versions of a data object. Multiple versions may be used for many different purposes, for example, for implementing temporal databases, to allow recovery after a system crash, to support alternative documents or designs, etc. When versions are used, however, every query to the database must include version information in order to ensure that the query is able to consistently access the same version. Thus, unless each database client adds version parameters to every query, queries will return incorrect results.

BRIEF SUMMARY

Accordingly, embodiments of the present invention include a method, computer program product and a system for accessing versioned data objects within a database comprising creating a first new connection to a database stored in a memory, where the first new connection is configured with contextual information about data objects within the database and includes a first existing database connection, and where the first new connection is of a different connection type than the first existing database connection, receiving a first query from a first client, where the first query requests access to a versioned data object stored in the database, and modifying the received first query to add contextual information configured on the first new connection, so that the modified first query is able to retrieve a first version of the versioned data object, where the first version corresponds to the contextual information.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIG. 4 is a flowchart depicting a process for modifying an existing computer system having a database connection source to include a new database connection source, according to an embodiment of the present invention.

FIG. 5 is a flowchart depicting a process for modifying an existing computer system having an existing-type database connection to include a new-type database connection, according to an embodiment of the present invention.

FIG. 6 is a flowchart depicting a process for modifying a query for a database object according to an embodiment of the present invention.

FIG. 7 is a flowchart depicting a process for creating a new version of a database object according to an embodiment of the present invention.

DETAILED DESCRIPTION

The present embodiments provide a context- and version-aware facade for database queries, which transparently provides context and version awareness to legacy database clients. For example, assume a database is constructed and populated with data objects, and is used by database clients for some time in this state. At a later time, versioning and context capabilities are added to the database, and the database facade of the present embodiments is implemented. The database facade provides context and version functionality to existing (legacy) database clients by transparently intercepting and modifying queries from the database clients so that the queries may utilize the proper context and version of the data objects in the database. Thus, the present embodiments permit legacy database clients to utilize databases having contextual and versioned data, without needing to rewrite the database client code to make it context and version aware.

Figure 1:
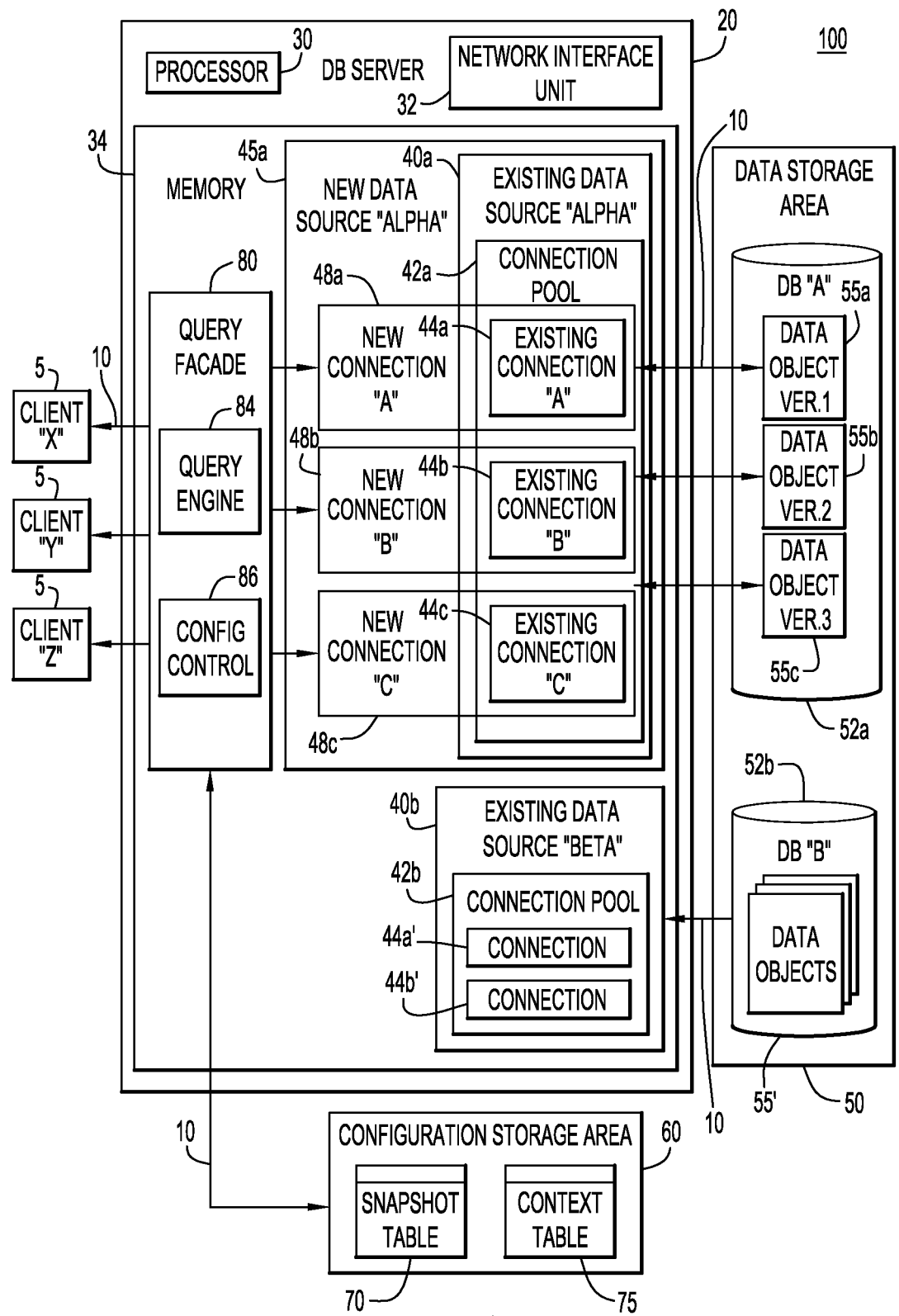
FIG. 1 is a block diagram illustrating a computer system having multiple databases and data connection sources, according to an embodiment of the present invention.

Referring now to the Figures, an exemplary computer system 100 according to embodiments of the present invention is illustrated in FIG. 1. The exemplary computer system 100 comprises a database server 20 that is capable of processing database queries and is connected via connections 10 to one or more database clients 5, a data storage area 50 having databases 52 stored therein, and a configuration storage area 60. The system 100 may be a client-server system, database system, virtual desktop system, distributed computer system, cloud-based system, clustered database, data center, storage area network (SAN), or in any other suitable system, for example in a system designed for the provision of Software-as-a-Service (SaaS), such as a cloud data center or hosted web service.

Clients 5 may be applications or devices that utilize the databases 52, for example user applications that permit a user to interface with the system, by e.g., entering data into the system, retrieving a database object, or querying a database. As described further with respect to FIG. 2, each client 5 may be a conventional or other computer system or device, such as a thin client, computer terminal or workstation, personal desktop computer, laptop or netbook, tablet, cellular phone, networked television, or other device capable of acting as a client in the described system. Alternatively, the clients 5 may each be a software application that processes data from a corresponding database 52 to provide business or other functions for a particular implementation. These software applications typically include one or more database queries to retrieve and process data from a corresponding database 52.

Data storage area 50 comprises one or more databases 52 stored therein. Storage area 50 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Databases 52 may be implemented by any quantity of any type of conventional or other databases (e.g., network, hierarchical, relational, object, etc.) or storage structures (e.g., files, data structures, web-based storage, disk or other storage, etc.) and may comprise an enterprise data source (e.g., DB2, Oracle, IBM Enterprise Content Management (ECM) systems, ERP systems, etc.), personal and intra-organization data sources (e.g., spreadsheets, databases, etc.), or web-based data sources such as public databases (e.g., tax records, real estate records, court documents, etc.) and the like. The databases may store any desired information arranged in any fashion (e.g., tables, hierarchical, relations, objects, etc.), and may store additional information such as metadata in addition to data. In the depicted embodiment, the databases 52 store multiple data objects 55 which may be, for example, tables, indices, or stored queries.

Configuration storage area 60 comprises a snapshot table 70 and context table 75 stored therein. Storage area 60 may be implemented by any quantity of any type of conventional or other memory or storage device, and may be volatile (e.g., RAM, cache, flash, etc.), or non-volatile (e.g., ROM, harddisk, optical storage, etc.), and include any suitable storage capacity. Although snapshot table 70 and context table 75 are referred to herein as "tables", it is understood that they may each be any suitable data storage structure, for example one or more databases implemented on a solid state drive or in a RAM cloud, and need not be tables per se. No particular mechanism for maintaining the snapshot or version data is required by the present embodiments. Thus, for example, the present embodiments may utilize known techniques for maintaining snapshots and versions, for example a concurrency control method such as multiversion concurrency control.

Snapshot table 70 comprises one or more "snapshot" or version identifiers for one or more data objects. As used herein, a "snapshot" is a read-only static view of a data set such as a database object 55 or source database 52 as it existed at the time the snapshot was created. To a database client accessing a particular snapshot, the snapshot appears never to change, providing continuity of data. The snapshot identifiers in snapshot table 70 may be identifiers of data objects (e.g., tables, indices, stored queries, etc.) or may be in any other suitable form. For example, in the depicted example, there would be at least three different snapshot identifiers in table 70 referring to data object 55*a* "Version 1", data object 55*b* "Version 2" and data object 55*c* "Version 3" as stored in DB "A" 52*a*. In one embodiment, the snapshot table comprises an ID column and a Name column. The ID may be a standard database primary key for the row in the snapshot table, and the Name is the name of a particular version or snapshot, e.g. "Version 2". The actual rows in the data tables in database 52 then contain references to the snapshot table entry to which they belong.

Context table 75 comprises contextual information about the data objects 55 stored in databases 52. The contextual information may be, e.g., the identity of a particular client associated with a particular version of a data object. The contextual information is available for every transaction, but is not dependent on snapshots. In one embodiment, the context table 75 comprises a ContextName column and a Snapshot_ID column. The ContextName is the name of a context data item, and the SnapShot_ID is a foreign key reference to an entry in the snapshot table 70. For example, in the depicted example, there may be one or more contextual information entries, for example there may be a contextual information entry associating client "x" with a particular snapshot "y" that is in turn associated with data object 55*a* "Version 1", or there may be a contextual information entry associating multiple clients with snapshot "y" that is in turn associated with data object 55*a* "Version 1", or there may be any other suitable contextual information.

The database server 20 comprises a processor 30, network interface unit 32, and memory 34. Processor 30 is, for example, a data processing device such as a microprocessor, microcontroller, system on a chip (SOC), or other fixed or programmable logic, that executes instructions for process logic stored in respective memory (not shown). Each processor 30 may be a multi-processor, and have multiple CPUs, multiple cores, multiple dies comprising multiple processors, etc. Network interface unit 32 enables communication to the computer system 100. Memory 34 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. The database server 20 may be part of, e.g., a database management system such as IBM DB2® (DB2® is a trademark of International Business Machines Corporation).

Memory 34 comprises one or more existing database connection sources 40 resident therein, as well as a query facade 80. The existing data sources 40 each comprise data access logic that provides the manner in which to access a particular database (e.g., rules or criteria, connection or other information, etc.). For example, the database connection sources may be Java DataSources. Each database connection source may comprise one or more connection pools 42, which provide connection allocation management functions (e.g., controls a number of connections to the database, etc.). Each connection pool 42 comprises one or more database connections 44, which provide connections to one or more databases 52 in data storage area 50. For example, FIG. 1 depicts existing data source "Alpha" 40*a* as having one connection pool 42*a* comprising three database connections 44*a*, 44*b* and 44*c* to database "A" 52*a*, and data source "Beta" 40*b* as having one connection pool 42*b* comprising two database connections 44*a*' and 44*b*' to database "B" 52*b*.

The existing-type database connections 44 may be any suitable database connections implemented in any suitable fashion, for example they may be direct connections implemented via, e.g., Java DataBase Connectivity (JDBC), Open DataBase Connectivity (ODBC) or IBM DB2 Call Level Interface (CLI), or indirect connections implemented via, e.g., IBM pureQuery, Java Persistent API (JPA), Hibernate, etc. The connections 44 may comprise or work in conjunction with database drivers (not shown) in order to provide database connection functionality. The number of connections 44 may be a property of a database 52 and indicate the number of open connections allowed to the database, where actions of the database clients 5 are controlled based on the number of connections to the database. For example, database clients 5 may take different courses of action based on the number of connections to the database being active or exhausted. Alternatively, the number of connections may be a property of a database client 5 and indicate the number of open connections allowed to be maintained by connection pool 42. Not shown are database drivers, which may include a Java database driver (e.g., JDBC, etc.), or other drivers or mechanisms compatible with any suitable computer programming language, and which provide actual communication with the databases 52 corresponding to each existing database connection source 40.

As is further explained with respect to FIG. 4, memory 34 may also comprise one or more new database connection sources 45. Each new database connection source 45 "wraps" an existing database connection source 40, and may be created by, e.g., instantiating a new database connection source 45 that refers to the existing database connection source 40 and also to the pertinent contextual information stored in context table 75 for the associated database(s) 52. When the new database connection source 45 receives a request for a database connection, the new database connection source 45 requests an existing-type connection 44 from the existing database connection source 40, and then "wraps" that existing-type connection 44 with a new-type connection 48, which is configured with contextual information about data objects in the database(s) 52 associated with the connection 44. In this manner, the new database connection source 45 is able to provide a new-type database connection 48 to a database client 5, without the need for the database clients 5 to be aware of the contextual information (e.g., versions) of the data objects. For example, in the depicted example, client "x" 5 queries database "A" 52*a* via query facade 80 and new connection "A" 48*a*, which automatically and transparently modifies the query to request the appropriate version of the requested data object, for example a version associated with client "x" 5.

Database server 20 also comprises a query facade 80, which may be resident in memory 34 as depicted in FIG. 1. Query facade 80 comprises query engine 84, and configuration controller 86. Query engine 84 receives and modifies queries to the database in order to add contextual information, e.g., to enable legacy clients 5 to work with the appropriate versions of data objects stored in databases 52. Configuration controller 86 communicates with snapshot table 70 and context table 75 to configure the data sources and connections, and to provide contextual information to the mapping logic 82 and query engine 84 in order to facilitate database queries. The query engine 84 and configuration controller 86 work together to control execution of the query language from the clients 5, including, e.g., adding or replacing contextual information in queries, etc. Further details of the operation of query facade 80 are provided with respect to FIGS. 3 through 7.

Clients 5, processor 30, data sources 40, 45, and query facade 80 may each be implemented in the form of a processing system, or may be in the form of software. They can each be implemented by any quantity of conventional or other computer systems or devices (e.g., computer terminals, personal computers of all types (e.g., including tablets, laptops, netbooks, etc.), or cellular telephones/personal data assistants of all types, and may include any commercially available operating systems for all types of computer hardware and any commercially available or custom software (e.g., browser software, communications software, word processing software, etc.). These systems may include processors, memories (e.g., RAM, cache, flash, ROM, solid-state, hard-disk, etc.), internal or external communications devices (e.g., modem, network adapter, etc.), I/O interfaces, output devices (e.g., displays, printers, etc.), and input devices (e.g., physical keyboard, touch screen, mouse, trackpad, microphone for voice recognition, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

It is understood that any of the various components of the system 100 may be local to one another, or may be remote from and in communication with one or more other components via any suitable communication means or devices 10, for example a network such as a WAN, a LAN, Internet, Intranet, mobile wireless, etc. In one embodiment, the clients 5 are located remotely from the database server 20 and are communicatively connected to each other, for example, via the illustrated network connections 10, which represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement.

The computer system 100 may include additional servers, clients, and other devices not shown, and individual components of the system may occur either singly or in multiples. For example, there may be more than one database server 20, more than one processor 30, more than two databases 52 and corresponding data sources 40, etc., and the functionality of various components (e.g., query engine 84, and configuration control 86) may be combined into a single device or split among multiple devices. Also for example, the database server 20, storage area 50 and storage area 60 may be located locally to one another (e.g., on the same network or in the same physical computing device), or they may be remotely located from each other as is shown in FIG. 1. In a further example, storage areas 50, 60 and memory 34 may be part of one virtual address space spanning multiple primary and secondary storage devices.

Figure 2:
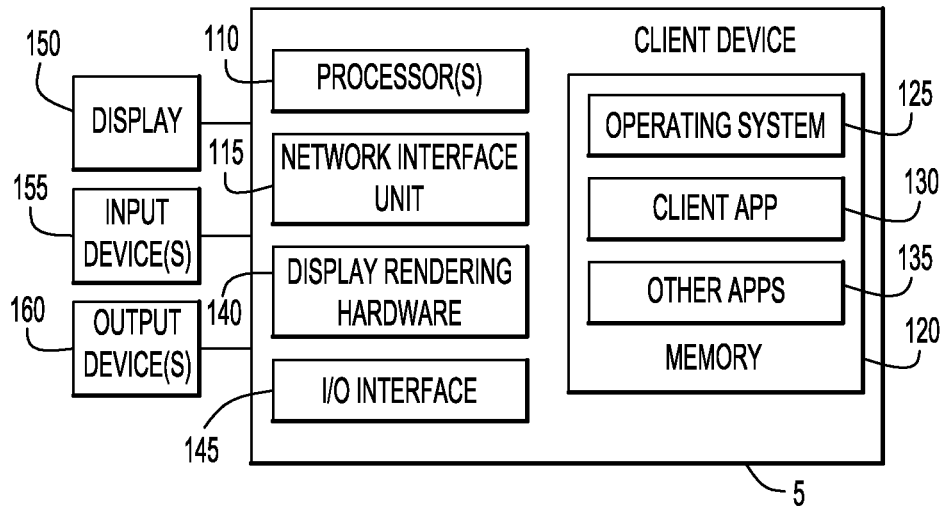
FIG. 2 is a block diagram illustrating a client device that may be used in the computer systems of the present invention.

Referring to FIG. 2, an example of a client device 5 that may be used in system 100 is depicted. Client device 5 comprises one or more processors 110, a network interface unit 115, memory 120, display rendering hardware 140, and input/output interface 145. Resident in memory 120 are operating system 125, client application 130, and optionally other applications 135. The client application 130 provides an interface such as a graphical user interface (GUI) for a user of the client device 5 to interact with the database server 20. Processor 110 is, for example, a data processing device such as a microprocessor, microcontroller, system on a chip (SOC), or other fixed or programmable logic, that executes instructions for process logic stored in memory 120. Network interface unit 115 enables communication to the computer system 100. Memory 120 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Display rendering hardware 140 may be a part of processor 110, or may be, e.g., a separate Graphics Processor Unit (GPU).

I/O interface 145 enables communication between display device 150, input device(s) 160, and output device(s) 170, and the other components of client device 5, and may enable communication with these devices in any suitable fashion, e.g., via a wired or wireless connection. The display device 150 may be any suitable display, screen or monitor capable of displaying information to a user of a client device 5, for example the screen of a tablet or the monitor attached to a computer workstation. Input device(s) 160 may include any suitable input device, for example, a keyboard, mouse, trackpad, touch input tablet, touch screen, camera, microphone, remote control, speech synthesizer, or the like. Output device(s) 170 may include any suitable output device, for example, a speaker, headphone, sound output port, or the like. The display device 150, input device(s) 160 and output device(s) 170 may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

Figure 3:
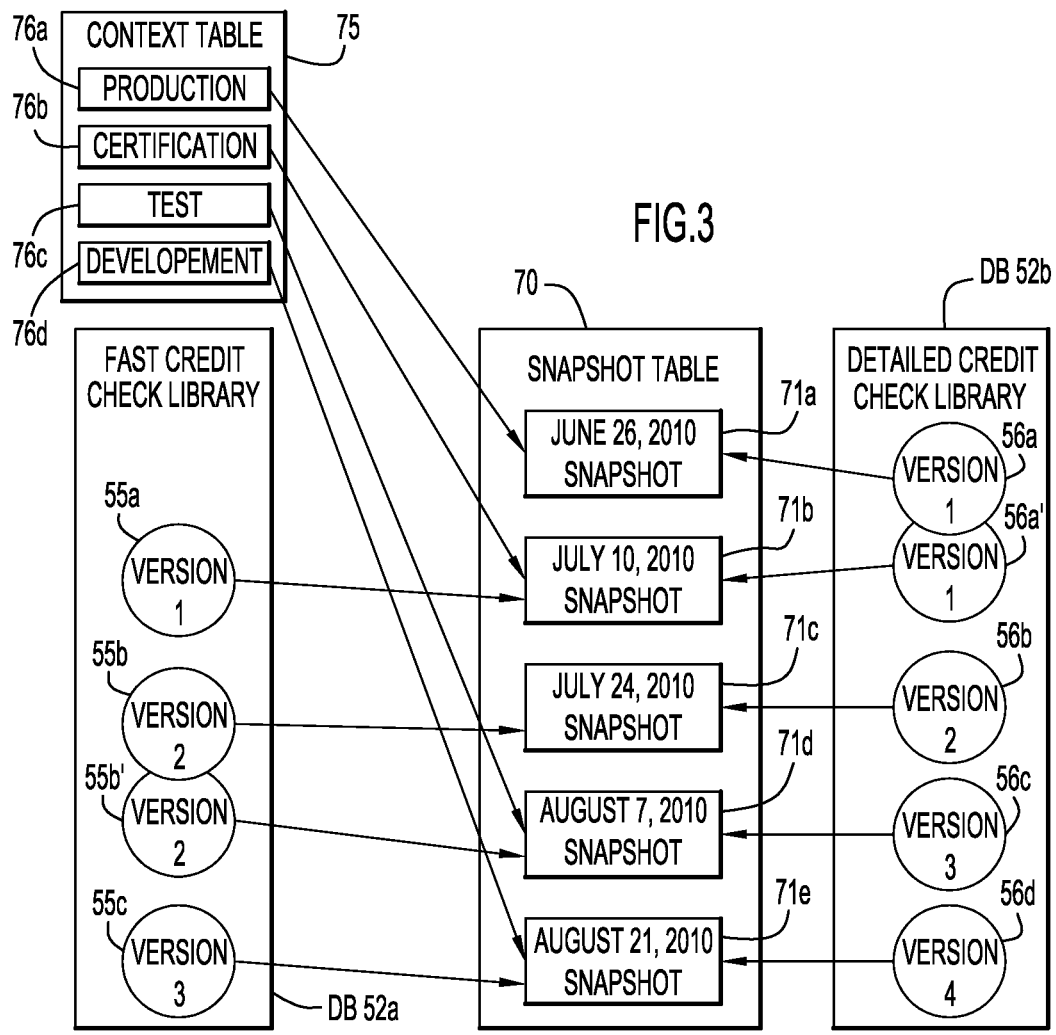
FIG. 3 is a block diagram illustrating the interrelationship of a context table, a snapshot table, and two different database tables according to an embodiment of the present invention.

FIG. 3 depicts the interrelationship of a context table 75, a snapshot table 70, and two different databases 52*a*, 52*b* according to an embodiment of the present invention. In this example embodiment, there are two different databases, "fast credit check library" 52*a* and "detailed credit check library" 52*b*, each having a number of different data object versions 55, 56 stored therein. The inter-relationship between the snapshot table 70 and the databases 52 may be seen by examining how each data object version 55, 56 is associated with a particular snapshot 71. For example, snapshot 71*a* "Jun. 26, 2010" is associated with "detailed" data object 56*a* "Version 1" in the "detailed" database 52*b* but is not associated with a "fast" data object 55 in the "fast" database 52*a*, and snapshot 71*b* "Jul. 10, 2010" is associated with "detailed" data object 56*a*' "Version 1 Copy" and "fast" data object 55*a* "Version 1". Similarly, snapshot 71*c* "Jul. 24, 2010" is associated with data object 56*b* "Version 2" and data object 55*b* "Version 2", snapshot 71*d* "Aug. 7, 2010" is associated with data object 56*c* "Version 3" and data object 55*b*' "Version 2 Copy", and snapshot 71*e* "Aug. 21, 2010" is associated with data object 56*d* "Version 4" and data object 55*c* "Version 3".

Context table 75 may be seen to contain four contextual information entries 76 associated with particular snapshots in snapshot table 70. For example, depicted are four separate contextual information entries associated with four different customer operating environments: production 76*a*, certification 76*b*, test 76*c* and development 76*d*. As can be seen, each contextual information entry 76 is associated with a snapshot 71 in snapshot table 70, so that for example, clients associated with the certification contextual information 76*b* will access only data object snapshot 71*b*, but clients associated with the development contextual information 76*d* will access only data object snapshot 71*e*. In general, the present embodiments may associate a particular contextual information entry with a snapshot or version of a data object to ensure that each client associated with that contextual information entry "sees" a consistent version of the data. This association provides particular benefits for long-running transactions, by enabling these transactions to work with a stable and consistent snapshot while the underlying data is being changed over time.

The contextual information may be client-specific, for example a particular accounting software application may always be associated with the most recent snapshot while a testing software application may be associated with any snapshot regardless of the time it was stored, or the contextual information may be environment-specific, for example one or more clients in a particular environment (e.g., a customer environment, development environment, testing environment, etc.) may be associated with a particular snapshot. Or, for example, the contextual information may be network- or client device-specific, so that clients on a particular network or type of client device (e.g., on a private network or using a personal computer) access certain versions, but clients on another network or another type of client device (e.g., a public network or using a mobile phone) access different versions of the data object. Thus the contextual information may comprise a unique client identifier to identify a particular client or group of clients associated with a particular version or versions of the data object, or may comprise an environmental specification specifying an association between a particular environment (or clients in a particular environment) and a particular version or versions of the data object.

FIGS. 4-7 depict various processes for modifying an existing computer system to transparently provide context and version support to database clients, transparently modifying queries to accommodate context and version information, and creating database object versions (snapshots) for use in the modified systems, according to various embodiments of the present invention. Although each of these Figures and the accompanying descriptions refer to a single data object, a single client, a single data source and a single database connection, it is understood that the present embodiments are not so limited, and that the processes are performed on or with respect to multiples of all of these entities (e.g., data objects, data sources, clients, etc.) in system 100 at the same or different times. For example, the various processes may run concurrently or sequentially, may be scheduled to run at periodic intervals or may be run on demand, or may run at any time and in any combination desired for a particular implementation.

Referring now to FIG. 4, reference numeral 200 generally designates a flow chart depicting an example of a process for making one-time modifications to an existing computer system to transparently provide context and version support to database clients, by adding a new database connection source, context table and snapshot table, according to an embodiment of the present invention. Although the following process 200 is described as performed by the configuration controller 86 of query facade 80, it should be understood that this process 200 may be carried out by any suitable server, client or other device, such as, e.g., the processor 30 in conjunction with query facade 80, the configuration controller 86, or by any other suitable component(s) or combination of components of the system 100.

In steps 205 and 210, the controller creates and/or modifies snapshot table 70 and context table 75, and populates them (or re-populates them) with the appropriate data. In step 215, the controller modifies the data tables used by the database clients 5, for example the data tables stored in data storage area 50, to include foreign key references to the snapshot table 70 (e.g., by adding a Snapshot_ID column to the tables). In step 220 the controller creates new database connection source 45, and in step 225 configures the new database connection source 45 with contextual information about data objects in the database(s) associated with the new database connection source 45. This configuration results in the controller in step 230 creating an instance of an existing database connection source 40 with the same contextual information configured in the new database connection source 45, and in step 235 creating an instance of the new data source with a reference to the just-created instance of the existing database connection source 40 and the contextual information configured in the new database connection source 45. After step 235, the process 200 ends with respect to this data source.

Referring now to FIG. 5, reference numeral 300 generally designates a flow chart depicting an example of a process for modifying an existing computer system to transparently provide context and version support to database clients, by adding a new type of database connection, according to an embodiment of the present invention. Although the following process 300 is described as performed by a new database connection source 45, it should be understood that this process 300 may be carried out by any suitable server, client or other device, such as, e.g., the processor 30 in conjunction with query facade 80, the configuration controller 86, or by any other suitable component(s) or combination of components of the system 100.

In step 310, the controller receives a request for a new database connection, and in step 320 in response to the request, the new database connection source 45 requests an existing-type connection 44 from the existing database connection source 40. In step 330, the new database connection source 45 creates a new-type connection 48 that is configured with the contextual information and which comprises or "wraps" the existing-type connection 44. In step 340, the new database connection source 45 then grants the request for the new database connection using the new-type database connection 48. After step 340, the process 300 ends with respect to this data source.

Referring now to FIG. 6, reference numeral 400 generally designates a flow chart depicting an example of a process for transparently modifying a query for a database object to accommodate context and version information, according to an embodiment of the present invention. Although the following process 400 is described as performed by the query engine 84 of query facade 80, it should be understood that this process 400 may be carried out by any suitable server, client or other device, such as, e.g., the processor 30 in conjunction with query facade 80, or by any other suitable component(s) or combination of components of the system 100.

In step 410, the query engine receives a query for a database object from a database client 5, and in step 420 the query engine modifies the query, e.g., by adding appropriate contextual information to the query. The query may be in any query language suitable for use with the database server 20 and databases 52, or may be converted or modified into a suitable query language. In step 430 the query engine executes the query to retrieve the appropriate version of the database object corresponding to the contextual information added to the query. After step 430, the process 400 ends with respect to this query.

The client may express a query, or the query engine may modify a query to be expressed in one or more of the following query languages: Enterprise Java Beans Query Language (EJB-QL), Hibernate Query Language (HQL), Java Database Connectivity (JDBC), Java Data Objects Query Language (JDOQL), Object Query Language (OQL), Standard Query Language (SQL), Object Oriented SQL (OOSQL), SQL for Java (SQLJ), XQuery, or any other suitable language. The modification of the query may entail, e.g., adding query parameters to the query. For example, in one embodiment, query parameters such as the following are added to the end of a query:

```
AND Context.Name = [CONTEXT_DATA]
AND Snapshot.ID = Context.Snapshot_ID
AND [TABLE_NAME].Snapshot_ID = Snapshot.ID
```

In this embodiment, CONTEXT_DATA is the context data configured on the database connection 48 and TABLE_NAME is the name of any table that appears between "FROM" and "WHERE in the original query (and is, e.g., a data table in a database 52). If multiple tables appear in the original query, then the last AND clause is repeated for every table.

The queries modified by the present embodiments may be any type of query, or may be limited to particular query operations, for example, in one embodiment, the queries are read queries, i.e., the queries request read access to a data object.

Referring now to FIG. 7, reference numeral 500 generally designates a flow chart depicting an example of a process for creating database object versions (snapshots), according to an embodiment of the present invention. Although the following process 500 is described as performed by the database server 20, it should be understood that this process 500 may be carried out by any suitable server, client or other device, such as, e.g., the processor 30 in conjunction with query facade 80, the configuration controller 86, or by any other suitable component(s) or combination of components of the system 100. Further, although the following process 500 is described as creating a new version of an existing data object, it is understood that the same or similar process may be used or adapted for use with respect to the creation of a new data object.

In step 510, the server receives an indication that a database client 5 is making one or more changes to an existing data object, and in step 520 the server creates a new entry in snapshot table 70. The server in step 530 copies create copies of the current versions of all data to point to the new Snapshot entry, and in step 540 updates at least one row in the context table 75 to point to the new snapshot. In step 550 the server saves the changed data as a new version of the data object. This update to the context table 75 allows all queries for that context item to be automatically updated. After step 550, the process 500 ends with respect to this data object. In some embodiments, step 540 may be deferred to a later time, i.e., the server performs step 530 and 550 at one time and then performs step 540 at a later point in time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Smalltalk, C++ or the like, or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of accessing versioned data objects within a database, comprising:
    creating a first new connection to a database stored in a memory, wherein the first new connection is configured with contextual information about data objects within the database and includes a first existing database connection, and wherein the first new connection is of a different connection type than the first existing database connection;
    granting a request for a database connection using the first new database connection;
    receiving via the first new connection a first query from a first client, wherein the first query requests access to a versioned data object stored in the database; and
    modifying the received first query to add contextual information configured on the first new connection, so that modified first query is able to retrieve using the first existing database connection a first version of the versioned data object from among a plurality of versions of to the versioned data object stored in the database, wherein the first version corresponds the contextual information.

2. The computer-implemented method of claim 1, further comprising:
    executing the modified first query to retrieve the first version of the versioned data object from the database.

3. The computer-implemented method of claim 1, further comprising:
    creating a new database connection source for the database, wherein the new database connection source is configured with contextual information and wraps an existing database connection source for the database, wherein the creation of the first new connection is performed by the new database connection source.

4. The computer-implemented method of claim 1, wherein the received first query lacks contextual information about the requested versioned data object.

5. The computer-implemented method of claim 1, wherein the contextual information comprises version information.

6. The computer-implemented method of claim 1, wherein the contextual information comprises a client identifier that identifies which version of the versioned data object should be retrieved by a particular client.

7. The computer-implemented method of claim 1, wherein the contextual information comprises an environmental specification that identifies which version of the versioned data object should be retrieved by clients in a particular environment.

8. The computer-implemented method of claim 1, further comprising:
    creating a second new connection to the database, wherein the second new connection is configured with contextual information about data objects within the database and includes second existing database connection, and wherein the second new connection is of a different connection type than the second existing database connection;
    receiving a second query from a second client, wherein the second query requests access to the versioned data object; and
    modifying the received second query to add contextual information configured on the second new connection, so that the modified second query is able to retrieve a second version of the versioned data object, wherein the second version corresponds to the contextual information.

9. A computer program product for accessing versioned data objects within a database, comprising;
    a hardware computer readable storage medium having computer readable program code embodied therewith, the computer readable program code comprising computer readable program code configured to:
    create a first new connection to a database stored in a memory, wherein the first new connection is configured with contextual information about data objects within the database and includes a first existing database connection, and wherein the first new connection is of a different connection type than the first existing database connection;
    grant a request for a database connection using the first new database connection;
    receive via the first new connection a first query from a first client, wherein the first query requests access to a versioned data object stored in the database; and
    modify the received first query to add contextual information configured on the first new connection, so that the modified first query is able to retrieve using the first existing database connection a first version of the versioned data object from among a plurality of versions of the versioned data object stored in the database, wherein the first version corresponds to the contextual information.

10. The computer program product of claim 9, wherein the computer readable program code is further configured to:
    execute the modified first query to allow the first client read access to the first version of the versioned data object from the database.

11. The computer program product of claim 9, wherein the computer readable program code is further configured to:
    create a new database connection source for the database, wherein the new database connection source is configured with contextual information and wraps an existing database connection source for the database, wherein the creation of the first new connection is performed by the new database connection source.

12. The computer program product of claim 9, wherein the first new connection is a Java DataBase Connectivity (JDBC) connection.

13. The computer program product of claim 9, wherein the contextual information is client-specific.

14. The computer program product of claim 13, wherein the contextual information comprises a client identifier that identifies which version of the versioned data object should be retrieved by a particular client.

15. The computer program product of claim 9, wherein the contextual information is environment-specific.

16. The computer program product of claim 15, wherein the contextual information comprises an environmental specification that identifies which version of the versioned data object should be retrieved by clients in a particular environment.

17. The computer program product of claim 9, wherein the computer readable program code is further configured to:
- create a second new connection to the database, wherein the second new connection is configured with contextual information about data objects within the database and includes a second existing database connection, and wherein the second new connection is of a different connection type than the second existing database connection;
- receive a second query from a second client, wherein the second query requests access to the versioned data object; and
- modify the received second query to add contextual information configured on the second new connection, so that the modified second query is able to retrieve a second version of the versioned data object, wherein the second version corresponds to the contextual information.

18. A system for accessing versioned data objects within a database, comprising:
- a database comprising a plurality of versioned data objects stored in memory;
- a first database client;
- a table comprising contextual information about the plurality of versioned data objects stored in memory; and
- a processor configured with logic to:
- create a first new connection to the database, wherein the first new connection is configured with contextual information from the table and includes a first existing database connection, and wherein the first new connection is of a different connection type than the first existing database connection;
- grant a request for a database connection using the first new database connection;
- receive via the first new connection a first query from the first database client, wherein the first query requests access to a versioned data object stored in the database; and
- modify the received first query to add contextual information configured on the first new connection, so that the modified first query is able to retrieve using the first existing database connection a first version of the versioned data object from among a plurality of versions of the versioned data object stored in the database, wherein the first version corresponds to the contextual information.

19. The system of claim 18, wherein the first database client is a software application.

20. The system of claim 18, wherein the processor is further configured with logic to:
- execute the modified first query to allow the first client read access to the first version of the versioned data object from the database.

21. The system of claim 18, wherein the processor is further configured with logic to:
- create a new database connection source for the database, wherein the new database connection source is configured with contextual information and wraps an existing database connection source for the database, wherein the creation of the first new connection is performed by the new database connection source.

22. The system of claim 18, wherein the contextual information comprises version information.

23. The system of claim 18, wherein the contextual information is client- specific.

24. The system of claim 18, wherein the contextual information is environment-specific.

25. The system of claim 18, wherein the processor is further configured with logic to:
- create a second new connection to the database, wherein the second new connection is configured with contextual information about data objects within the database and includes a second existing database connection, and wherein the second new connection is of a different connection type than the second existing database connection;
- receive a second query from a second client, wherein the second query requests access to the versioned data object; and
- modify the received second query to add contextual information configured on the second new connection, so that the modified second query is able to retrieve a second version of the versioned data object, wherein the second version corresponds to the contextual information.

\* \* \* \* \*